United States Patent
Fu et al.

(10) Patent No.: US 10,064,136 B2
(45) Date of Patent: Aug. 28, 2018

(54) METHOD AND DEVICE FOR PUSHING INFORMATION

(71) Applicants: Shell Internet (Beijing) Security Technology Co., Ltd., Beijing (CN); Beijing Kingsoft Network Technology Co., Ltd., Beijing (CN); Beijing Kingsoft Internet Security Software Co., Ltd., Beijing (CN); Zhuhai juntian Electronic Technology Co., Ltd., Guangdong (CN); Conew Network Technology (Beijing) Co., Ltd., Beijing (CN)

(72) Inventors: Sheng Fu, Beijing (CN); Bin Bai, Beijing (CN); Qi Zhang, Beijing (CN)

(73) Assignees: Shell Internet (Beijing) Security Technology Co., Ltd., Beijing (CN); Beijing Kingsoft Network Technology Co., Ltd., Beijing (CN); Beijing Kingsoft Internet Security Software Co., Ltd., Beijing (CN); Zhuhai juntian Electronic Technology Co., Ltd., Guangdong (CN); Conew Network Technology (Beijing) Co., Ltd., Beijing (CN)

(*) Notice: Subject to any disclaimer, the term of this patent is extended or adjusted under 35 U.S.C. 154(b) by 15 days.

(21) Appl. No.: 14/907,489

(22) PCT Filed: Aug. 15, 2014

(86) PCT No.: PCT/CN2014/084569
§ 371 (c)(1),
(2) Date: Jan. 25, 2016

(87) PCT Pub. No.: WO2015/024483
PCT Pub. Date: Feb. 26, 2015

(65) Prior Publication Data
US 2016/0174156 A1      Jun. 16, 2016

(30) Foreign Application Priority Data

Aug. 20, 2013   (CN) .......................... 2013 1 0365169

(51) Int. Cl.
*G06F 15/16*     (2006.01)
*H04W 52/02*     (2009.01)
(Continued)

(52) U.S. Cl.
CPC ......... *H04W 52/0235* (2013.01); *H04L 51/00* (2013.01); *H04L 67/22* (2013.01);
(Continued)

(58) Field of Classification Search
USPC ................................. 709/203, 223, 224, 202
See application file for complete search history.

(56) References Cited

U.S. PATENT DOCUMENTS

| | | | |
|---|---|---|---|
| 8,655,321 B2* | 2/2014 | Baer | H04M 1/72563 455/412.2 |
| 2006/0135217 A1 | 6/2006 | Sung et al. | |
| 2010/0120477 A1* | 5/2010 | Imai | H04W 52/027 455/574 |

FOREIGN PATENT DOCUMENTS

| CN | 1794137 A | 6/2006 |
|---|---|---|
| CN | 101335369 | 12/2008 |

(Continued)

OTHER PUBLICATIONS

Chinese Office Action and Translation of Office Action from SIPO dated Oct. 23, 2015 for CN Application No. 201310365169.2.
(Continued)

*Primary Examiner* — Lan-Dai T Truong
(74) *Attorney, Agent, or Firm* — Lee & Hayes, PLLC; Sally Teng; Christopher J. White

(57) ABSTRACT

Disclosed are an information pushing method and a client. The method is applied in the client, and the client collects
(Continued)

use habit information of a user. The method comprises: detecting whether an information pushing trigger condition is satisfied, and if yes, obtaining current battery power information and current time information of the client; generating first prompt information matched with a current state of the user according to the usage habit information, the current battery power information and the current time information; and pushing the first prompt information.

15 Claims, 5 Drawing Sheets

(51) Int. Cl.
*H04L 12/58* (2006.01)
*H04L 29/08* (2006.01)
*H04L 29/06* (2006.01)

(52) U.S. Cl.
CPC .............. *H04L 67/26* (2013.01); *H04L 67/38* (2013.01); *H04L 67/42* (2013.01); *H04L 67/18* (2013.01); *Y02D 70/00* (2018.01); *Y02D 70/1224* (2018.01); *Y02D 70/142* (2018.01); *Y02D 70/144* (2018.01)

(56) References Cited

FOREIGN PATENT DOCUMENTS

| CN | 101505284 A | 8/2009 |
|---|---|---|
| CN | 102005620 A | 4/2011 |
| CN | 102478951 | 5/2012 |
| CN | 103199310 A | 7/2013 |
| CN | 103428075 A | 12/2013 |

OTHER PUBLICATIONS

Chinese Office Action and Translation of Office Action from SIPO dated Dec. 21, 2016 for CN Application No. 201310365169.2.
Chinese Office Action and Translation of Office Action from SIPO dated Jun. 17, 2016 for CN Application No. 201310365169.2.
International Search Report for Application No. PCT/CN2014/084569, dated Nov. 28, 2014, 4 pages.

* cited by examiner

METHOD AND DEVICE FOR PUSHING INFORMATION

CROSS REFERENCE TO RELATED APPLICATION

This application is a U.S. national phase application of International Application PCT/CN2014/084569, with an international filing date of Aug. 15, 2014, which is based on and claims priority to Chinese Patent Application No. 201310365169.2, filed on Aug. 20, 2013, the entire contents of which are incorporated herein by reference.

FIELD

The present disclosure generally relates to an information pushing technology field, and more particularly to a method and a device for pushing information.

BACKGROUND

Information pushing mainly refers to pushing information to a client actively, so as to realize a purpose of pushing certain specific information.

In the related art, when pushing information, the information pushed to each user is identical. For example, when a battery remaining capacity of a mobile terminal is 10%, the mobile terminal will push information "the battery remaining capacity is 10%" to the client automatically.

The existing information pushing method just collates collected information simply and mechanically to obtain a message and pushes the message to the user, such that the message usually causes interference to the user, which significantly reduces a desired effect.

SUMMARY

Embodiments of the present disclosure provide a method and a device for pushing information, which takes actual scenario features and user behavior characteristics into consideration so as to avoid interference to the user caused by pushing information, thus enhancing a desired effect of pushing the information. The technical solutions are as follows.

According to a first aspect, embodiments of the present disclosure provide a method for pushing information, the method is applied in a client, the client collects usage habit information of the user, and the method includes:

detecting whether an information pushing trigger condition is satisfied, if yes, obtaining current battery power information and current time information of the client;

generating first prompt information matched with a current state of the user according to the usage habit information, the current battery power information and the current time information;

pushing the first prompt information.

Preferably, the information pushing trigger condition includes a timing trigger, triggering at a specified location and triggering if detecting a specified signal.

Preferably, generating first prompt information matched with a current state of the user according to the usage habit information, the current battery power information and the current time information includes:

determining state information of the client during a predetermined period starting from the current time according to the current time information and the usage habit information of the user;

calculating an estimated power consumption during the predetermined period starting from the current time according to the state information;

generating the first prompt information having a power prompt function according to the current battery power information and the estimated power consumption.

Preferably, generating first prompt information matched with a current state of the user according to the usage habit information, the current battery power information and the current time information includes:

determining state information of the client during a predetermined period starting from the current time according to the current time information and the usage habit information of the user;

generating the first prompt information having a battery usage scheme according to the state information.

Preferably, if the information pushing trigger condition is the timing trigger, and if a predetermined subscription trigger time is reached, the method further includes:

detecting a current geographic location of the client;

obtaining subscription information matched with the geographic location;

using the subscription information as second prompt information; and pushing the second prompt information.

Preferably, collecting the usage habit information of the user by the client includes:

recording running information of respective functions in the client;

recording running information and updating information of respective applications in the client;

obtaining the usage habit information of the user by statistics according to recorded information.

According to a second aspect, embodiments of the present disclosure provide a client, including:

an information collecting unit, configured to collect usage habit information of a user;

a detecting unit, configured to detect whether an information pushing trigger condition is satisfied, and to trigger a first obtaining unit if the information pushing trigger condition is satisfied;

a first obtaining unit, configured to obtain current battery power information and current time information of the client;

a matching unit, configured to generate first prompt information matched with a current state of the user according to the usage habit information, the current battery power information and the current time information;

a pushing unit, configured to push the first prompt information.

Preferably, the information pushing trigger condition comprises a timing trigger, triggering at a specified location and triggering if detecting a specified signal.

Preferably, the matching unit includes:

a state determining sub-unit, configured to determine state information of the client during a predetermined period starting from the current time according to the current time information and the usage habit information of the user;

a calculating sub-unit, configured to calculate an estimated power consumption during the predetermined period starting from the current time according to the state information;

a first generating sub-unit, configured to generate the first prompt information having a power prompt function according to the current battery power information and the estimated power consumption.

Preferably, the matching unit includes:

a state determining sub-unit, configured to determine state information of the client during a predetermined period starting from the current time according to the current time information and the usage habit information of the user;

a second generating sub-unit, configured to generate the first prompt information having a battery usage scheme according to the state information.

Preferably, the client further includes a second obtaining unit configured to detect a current geographic location of the client and to obtain subscription information matched with the geographic location, if the information pushing trigger condition is the timing trigger and if a subscription trigger time is reached, in which the pushing unit is further configured to use the subscription information as second prompt information and to push the second prompt information.

Preferably, the information collecting unit includes:

a first recording sub-unit, configured to record running information of respective functions in the client;

a second recording sub-unit, configured to record running information and updating information of respective applications in the client;

a counting sub-unit, configured to obtain the usage habit information of the user by statistics according to recorded information.

According to a third aspect, embodiment of the present disclosure provide a readable storage medium for storing computer programs that, when executed, performs the method for pushing information described above.

It can be seen from the above technical solutions that, with embodiments of the present disclosure, the usage habit information of the user is collected, and the current battery power information and current time information of the client is obtained in the premise of satisfying the trigger condition, and based on this, the first prompt information matched with the current state of the user is generated and pushed to the client. In the present disclosure, actual scenario features and user behavior characteristics are taken into consideration when pushing information, specifically, for different scenarios and different user behaviors, different information is pushed, which reduces interference to the user caused by pushing information and significantly enhances the desired effect of pushing the information. Certainly, any product or method implementing the present disclosure is not required to realize all the advantages described above.

BRIEF DESCRIPTION OF THE DRAWINGS

In order to explicitly illustrate embodiments of the present disclosure or technical solutions in the related art, a brief introduction for the accompanying drawings used when describing the embodiments or the related art will be listed as follows. Apparently, the drawings described below are only corresponding to some embodiments of the present disclosure, and those skilled in the art may obtain other drawings according to these drawings without creative labor.

DETAILED DESCRIPTION

In the following, technical solutions in embodiments of the present disclosure will be described clearly and completely with reference to drawings in the embodiments. Apparently, the described embodiments are only part of embodiments of the present disclosure, instead of the entire embodiments. Based on embodiments described herein, those skilled in the art may obtain all other embodiments without creative labor, which belongs to the protection scope of the present disclosure.

Embodiments of the present disclosure provide a method and a device for pushing information, which takes actual scenario features and user behavior characteristics into consideration when pushing information, and pushes different information for users having different actual scenario features and difference behavior characteristics.

In the following, the present disclosure is described in detail with reference to specific embodiments.

Figure 1:
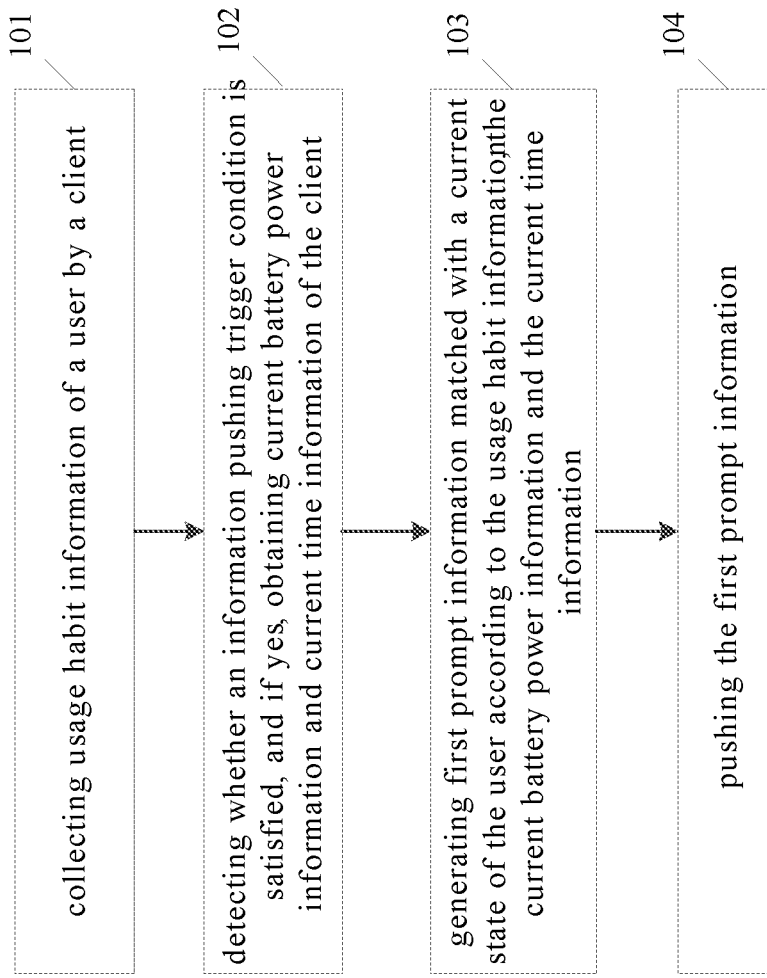
FIG. 1 is a flow chart of a method for pushing information according to an embodiment of the present disclosure.

Referring to FIG. 1, which is a flow chart of a method for pushing information according to an embodiment of the present disclosure, this embodiment is applied in a client, and includes following steps.

In step 101, the client collects usage habit information of the user.

Specifically, the client may realize the information collection by the following way.

Running information of respective functions in the client is recorded, such as, turning on WiFi during a certain period, turning on Bluetooth during a certain period, turning on GPRS during a certain period, etc.

Running information and updating information of respective applications in the client is recorded, such as communicating during a certain period, running game applications during a certain period, connecting to the network during a certain period, etc.

The usage habit information of the user is obtained by statistics according to the recorded information. Specifically, comprehensive statistics is performed according to the above records, for example, the statistical result may be:

7:30 a.m.-8:30 a.m. every Monday to Friday, generally turning on the networking function;

9:30 a.m.-11:30 a.m. every Monday to Friday, more call records;

6:00 p.m.-7:00 p.m. every Monday to Friday, generally running the game applications;

. . . .

It should be noted that, the method of collecting the usage habit information is not limited herein, and any collection method may be applied in the present disclosure. Moreover, the above descriptions are only examples illustrating which information is recorded and which information is counted, and similarly, the recorded information and statistical information is not limited herein, and any information needed to be recorded and counted in practical use can be applied in the present disclosure.

Furthermore, step 101 and step 102 can be executed in any order, and the collection operation may be performed periodically. Moreover, it is not required to execute step 102 as soon as step 101 is finished, that is, step 101 may be executed before step 102, or may be executed at any time after step 102 is executed, or may be executed at the same time when step 102 is executed.

In step 102, it is detected whether an information pushing trigger condition is satisfied, if yes, current battery power information and current time information of the client is obtained.

Herein, the information pushing trigger condition may include, but is not limited to, a timing trigger, triggering at a specified location, and triggering if detecting a specified signal.

If the information trigger mode is the timing trigger, then detecting whether the information pushing trigger condition is satisfied may specifically include detecting whether the system time is a predetermined time, for example 7:00 a.m., and when the system time reaches 7:00 a.m., the trigger condition is satisfied.

If the information trigger mode is triggering at a specified location, then detecting whether the information pushing trigger condition is satisfied may specifically include detecting whether the client is at a predetermined geographic location, for example, whether the client arrives at the company, and when the system detects that the client is located at the company, the trigger condition is satisfied.

If the information trigger mode is triggering if detecting a specified signal, then detecting whether the information pushing trigger condition is satisfied may specifically include detecting whether the client generates a specified signal, for example, whether a specified application is clicked, whether the client is connected to an external power supply, or whether the client is disconnected from the external power supply, and when the client detects the specified signal, the trigger condition is satisfied. For example, when it is detected that the client is disconnected from the external power supply, the trigger condition is satisfied.

The above timing trigger, triggering at a specified location, triggering if detecting a specified signal are only illustrative examples, and in practical use, the trigger condition is not limited to these.

Certainly, if it is detected that the information pushing trigger condition is not satisfied, the process may be finished, or step 102 may be repeated.

In step 103, first prompt information matched with a current state of the user is generated according to the usage habit information, the current battery power information and the current time information.

Herein, a possible implementation way is described as follows.

01) According to the current time information and the usage habit information of the user, state information of the client during a predetermined period starting from the current time is determined. Herein, a value of the predetermined period may be set according to actual needs, for example, two hours from the current time or three hours from the current time. The state information refers to the identified state of the client during the predetermined period, and specifically, the state of the client may be identified according to the usage habit of the user. For example, according to the collected usage habit information, the state of the client may be identified as a networking state from 7:00 a.m. to 9:00 a.m. every Monday to Friday, the state of the client may be identified as a call state from 9:00 a.m. to 12:00 a.m. every Monday to Friday, the state of the client may be identified as a game state from 5:30 p.m. to 7:30 p.m. every Monday to Friday, the state of the client may be identified as an idle state from 12:00 a.m. to 1:00 p.m. every Monday to Friday, etc.

In the present disclosure, the duration of the predetermined period is not limited, which may differ as the starting time differs, or may have the same starting time. Moreover, in the present disclosure, the state information of the client is not limited, and any possible state may be applied, for example, a shopping state, a reading state, and a listening state. Specifically, the state information may be determined according to the collected usage habit information and actual needs, that is, in practical use, according to needs, the same state information or different state information may be identified for different usage habits. Moreover, for a certain period, there may be only one state information, or there may be multiple state information. For example, the state of the client includes the call state and the networking state from 1:00 p.m. to 3:00 p.m.

02) An estimated power consumption during the predetermined starting from the current time is calculated according to the state information. Herein, the method for calculating the estimated power consumption is not limited, and any possible calculation method may be applied in the present disclosure. For example, the estimated power consumption under the game state may be calculated, the estimated power consumption under the networking state may be calculated, the estimated power consumption under the call state may be calculated, etc.

03) The first prompt information having a power prompt function is generated according to the current battery power information and the estimated power consumption.

Another possible way is as follows. The state information of the client during the predetermined period starting from the current time is determined according to the current time information and the usage habit information of the user, and the first prompt information having a battery usage scheme is generated according to the state information.

In step 104, the first prompt information is pushed.

With the method provided by embodiments of the present disclosure, by collecting the usage habit information of the user, by obtaining the current battery power information and the current time information of the client in the premise of satisfying the trigger condition, the first prompt information matched with the current state of the user is generated, and the first prompt information is pushed to the client. In the present solution, actual scenario features and user behavior characteristics are taken into consideration when pushing information, and different information is pushed with respect to different scenarios and different user behaviors, thus reducing interference to the user caused by pushing information and significantly enhancing the desired effect of pushing information.

It should be noted that, if the information pushing trigger condition is the timing trigger and if a predetermined subscription trigger time is reached, the method in the embodiment shown in FIG. 1 may further include: detecting a current geographic location (for example, Being China) of the client after the information pushing trigger condition is satisfied; obtaining subscription information (for example, weather forecast in Beijing, or news in Beijing) matched with the geographic location; using the subscription information as second prompt information; and pushing the second prompt information. In this way, not only the actual scenario features and user behavior characteristics are satisfied, but also the subscription demand of the user is satisfied, which further reduces the interference to the user caused by pushing information, significantly enhances the desired effect of pushing information, and satisfies actual needs of different users.

In the following, detailed description will be made with reference to different application scenarios.

Scenario 1: in this example, the predetermined trigger condition is whether the external power supply is disconnected, and when the system detects the specified signal (i.e. the external power supply is disconnected), the trigger condition is satisfied. The time of generating the trigger condition is 5:30 p.m.

In this example, the application performing the operation shown in FIG. 1 is the software "Kingsoft Doctor", and the client is a mobile phone. The application "Kingsoft Doctor" detects that the external power supply is disconnected at 5:30 p.m., i.e. the user disconnects the mobile phone from the external power supply, and then according to the predetermined trigger condition, after it is judged that the information pushing trigger condition is satisfied, the current battery power information and the current time information of the client is obtained. Herein, it is assumed that the current battery power information of the client is 90% remaining capacity, and the current time information is 5:30 p.m. on Monday.

According to the current time information and the usage habit information of the user, the state information of the client during the predetermined period starting from the current is determined to be: the state of the client is the game state during two hours from 5:30 p.m., and then the estimated power consumption may be calculated under the game state, in which the estimated power consumption may be represented as an estimated consumption time counted under the game state. For example, if the remaining power before playing games can be used for 12 hours, and after playing games for 2 hours, the remaining power can be used for 7 hours, then it can be considered that, the estimated consumption time is 5 hours. It should be noted that, in practical use, there are many factors affecting the estimated power consumption, and in the present disclosure, an approximate method is adopted, which omits some secondary factors, and thus the estimated power consumption is an approximate value close to the actual value.

Next, the first prompt information having the power prompt function is generated according to the current battery power information and the estimated power consumption, for example, the first prompt information "whether the current battery power can support the client until the user goes back home and charges it" is generated, and the first prompt information is pushed.

Scenario 2: in this example, the predetermined trigger condition is the timing trigger and the predetermined trigger time is 10:30 p.m., then when it is detected that the system time reaches 10:30 p.m., the trigger condition is satisfied.

In this example, the application performing the operation shown in FIG. 1 is the software "Kingsoft Doctor", and the client is a mobile phone. When the application "Kingsoft Doctor" detects that the system time reaches 10:30 p.m., it determines that the information pushing trigger condition is satisfied, and obtains the current battery power information and current time information of the client. Herein, it is assumed that the current battery power information of the mobile phone is 90% remaining power, and the current time information is 10:30 p.m.

At this time, according to the current time information and the usage habit information of the user, the state information of the client during the predetermined period starting from the current time is determined to be: the state of the client is the idle state during 8 hours from 10:30 p.m., and then the first prompt information having the battery usage scheme is generated according to the state information, for example, the first prompt information "it is suggested to use power-saving detection" is generated, and the first prompt information is pushed.

Scenario 3: in this example, the predetermined trigger condition is the timing trigger and the predetermined trigger time is 7:00 a.m., then when it is detected that the system time reaches 7:00 a.m., the trigger condition is satisfied.

In this example, the application performing the operation shown in FIG. 1 is the software "Kingsoft Doctor", and the client is a mobile phone. When the application "Kingsoft Doctor" detects that the system time reaches 7:00 a.m., it determines that the information pushing trigger condition is satisfied, and then when the predetermined subscription trigger time is reached, the application detects the current geographic location of the client, for example, the application detects that the current geographic location of the mobile phone is Beijing China, the application obtains the subscription information matched with the geographic location, for example, Beijing's weather forecast, uses the subscription information (i.e., Beijing's weather forecast) as the second prompt information, and pushes the second prompt information.

It can be seen that, in any one of the above scenarios, the actual scenario features and user behavior characteristics are taken into consideration when pushing information, and different information is pushed with respect to different scenarios and different user behaviors, thus reducing the interference to the user caused by pushing information and significantly enhancing the desired effect of pushing information. Moreover, in scenario 3, not only the actual scenario features and the user behavior characteristics are satisfied, but also the subscription demand of the user is satisfied, which further reduces the interference to the user caused by pushing information, significantly enhances the desired effect of pushing information, and satisfies the actual needs of different users.

Figure 2:
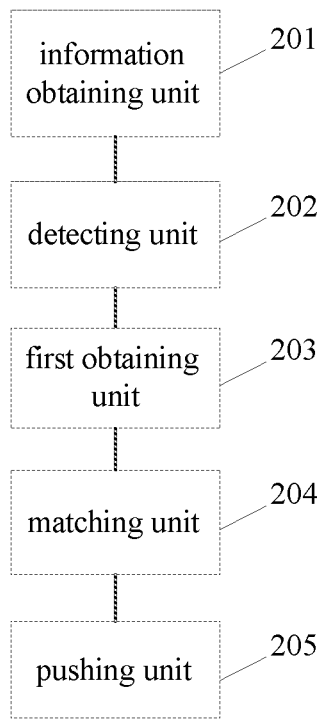
FIG. 2 is a block diagram of a client according to an embodiment of the present disclosure.

Embodiments of the present disclosure also provide a client. Referring to FIG. 2, the client includes an information collecting unit 201, a detecting unit 202, a first obtaining unit 203, a matching unit 204 and a pushing unit 205.

The information collecting unit 201 is configured to collect usage habit information of a user.

The detecting unit 202 is configured to detect whether an information pushing trigger condition is satisfied, and to trigger the first obtaining unit 203 if the trigger condition is satisfied.

The first obtaining unit 203 is configured to obtain current battery power information and current time information of the client.

The matching unit 204 is configure to generate first prompt information matched with a current state of the user according to the usage habit information, the current battery power information and the current time information.

The pushing unit 205 is configured to push the first prompt information.

The above information pushing trigger condition may include a timing trigger, triggering at a specified location, and triggering if detecting a specified signal.

In a possible implementation, the matching unit 204 may specifically include a state determining sub-unit, a calculating sub-unit, and a first generating sub-unit.

The state determining sub-unit is configured to determine state information of the client during a predetermined period starting from the current time according to the current time information and the usage habit information of the user.

The calculating sub-unit is configured to calculate an estimated power consumption during the predetermined period starting from the current time according to the state information.

The first generating sub-unit is configured to generate the first prompt information having a power prompt function according to the current battery power information and the estimated power consumption.

In another possible implementation, the matching unit 204 may include a state determining sub-unit and a second generating sub-unit.

The state determining sub-unit is configured to determine state information of the client during a predetermined period starting from the current time according to the current time information and the usage habit information of the user.

The second generating sub-unit is configured to generate the first prompt information having a battery usage scheme according to the state information.

Furthermore, the client further includes a second obtaining unit (not shown in FIG. 2).

The second obtaining unit is configured to detect a current geographic location of the client and to obtain subscription information matched with the geographic location, if the information pushing trigger condition is the timing trigger and if the subscription trigger time is reached.

In this case, the pushing unit 205 is further configured to use the subscription information as second prompt information and to push the second prompt information.

The information collecting unit 201 may include a first recording sub-unit, a second recording sub-unit and a counting sub-unit.

The first recording sub-unit is configured to record running information of respective functions in the client.

The second recording sub-unit is configured to record running information and updating information of respective applications in the client.

The counting sub-unit is configured to obtain the usage habit information of the user by statistics according to recorded information.

With the client provided by embodiments of the present disclosure, by collecting the usage habit information of the user, and by obtaining the current battery power information and current time information of the client in the premise of satisfying the trigger condition, the first prompt information matched with the current state of the user is generated and the first prompt information is pushed to the client. In the present solution, actual scenario features and user behavior characteristics are taken into consideration when pushing information, and different information is pushed with respect to different scenarios and different user behaviors, thus reducing interference to the user caused by pushing information and significantly enhancing the desired effect of pushing information.

Figure 3:
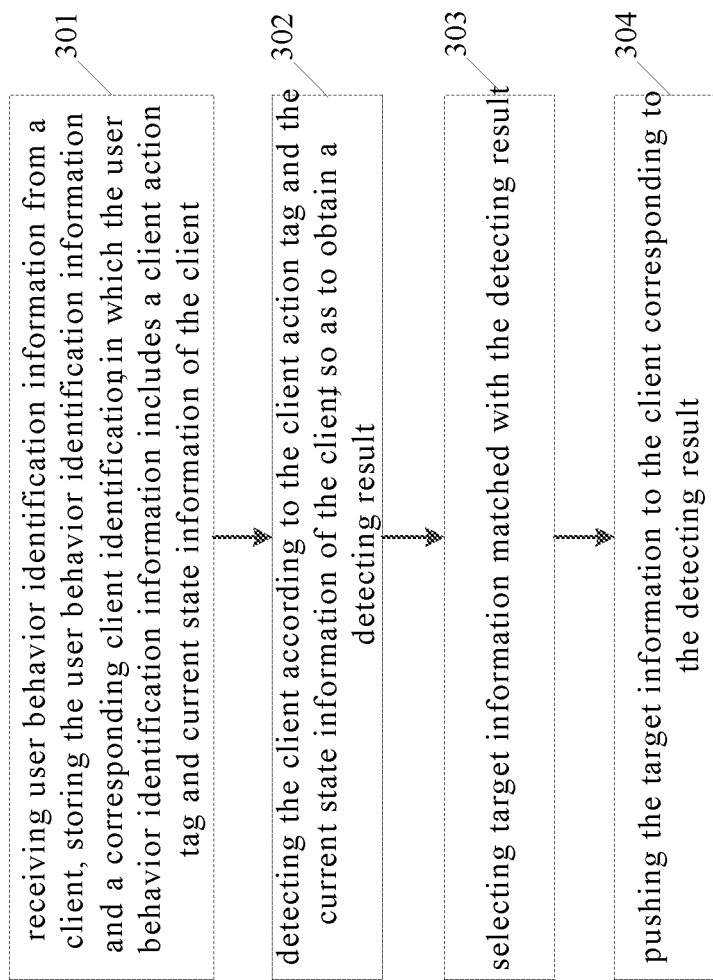
FIG. 3 is a flow chart of another method for pushing information according to an embodiment of the present disclosure.

FIG. 3 is a flow chart of another method for pushing information according to an embodiment of the present disclosure, and this embodiment may be applied in a server.

In step 301, the server receives user behavior identification information from a client, and stores the user behavior identification information and a corresponding client identification. The user behavior identification information includes a client action tag and current state information of the client.

In should be noted that, receiving the user behavior identification information from the client and storing the user behavior identification information and the corresponding client identification includes following steps:

receiving the user behavior identification information from the client and extracting the client identification;

judging whether the client identification is stored in local;

if no, directly storing the client identification and the user behavior identification information in local, in which there is a corresponding relationship between the client identification and the user behavior identification information; and if yes, replacing the user behavior identification information stored in local with the received user behavior identification information.

It should be noted that, step 301 and following step 302 are not executed continuously. In step 301, the identification information may be received from the client according to a certain receiving rule, and the receiving rule may be receiving the identification information once each day. The above description is only for illustrative explanation, and the receiving rule in practical use is not limited to this.

In step 302, the client is detected according to the client action tag and the current state information of the client, so as to obtain a detecting result.

It should be noted that, the detecting result is behavior attribute information based on the current state information of the client.

It should be noted that, the client action tag may be any one or any combination of game, shopping, novel, software, weather and house. Certainly, the above examples are only for illustrative explanation, and the client action tag is not limited to this in practical use.

When the client action tag is game, the current state information of the client may be any one or any combination of following items, but is not limited to following items in practical use:

a number of game applications installed in the client, for example, having installed five game applications;

a number of times for starting the game applications during a predetermined period, for example, starting the game applications three times every day;

a time duration of running the game applications during a predetermined period, for example, running the game applications for two hours every day;

a style of game applications running during a predetermined period, for example, running chess games every week;

a number of times for downloading updated game applications during a predetermined period, for example, downloading updated game applications four times every week;

a total number of times for downloading updated game applications, for example, downloading updated game applications ten times every month.

The predetermined period may be several hours, one day, one week, one month, etc.

When the client action tag is game, the above described current state information of the client is only illustrative, and is not used for limitation in practical use.

When the client action tag is shopping, the current state information of the client may be any one or any combination of following items, but not limited to the following items in practical use:

geographic location information of the client, for example, the client being located at Beijing China;

shopping category information of the client, for example, the shopping category being middle-aged and old clothing;

a time duration of browsing shopping websites, for example, browsing shopping websites two hours every day.

When the client action tag is shopping, the above described current state information of the client is only illustrative, and is not used for limitation in practical use.

In step 303, target information matched with the detecting result is selected.

In step 304, the target information is pushed to the client corresponding to the detecting result.

It can be seen from above that, in this embodiment, actual scenario features and user behavior characteristics are taken into consideration when pushing information, and different information is pushed with respect to different scenarios and different user behaviors, thus reducing interference to the user caused by pushing information and significantly enhancing the desired effect of pushing information.

In the following, detailed description will be made with reference to specific examples.

It is assumed that the client has stored the user behavior identification information corresponding to client X. When the client receives the user behavior identification information from the client again, it extracts the client identification from the received information first.

Herein, if the extracted client identification is Z, then the server first judges whether the client identification Z is stored in local. According to the above assumption in this embodiment, the server judges that there is no client identification Z in local, and directly stores the client identification Z and the corresponding user behavior identification information in local.

If the extracted client identification is X, then the server first judges whether the client identification X is stored in local. According to the above assumption in this embodiment, the server judges that the client identification X is stored in local, and replaces the locally stored user behavior identification information corresponding to the client identification X with the received user behavior identification information of client X.

In the following, take client X as an example to explain how to obtain the detecting result in detail.

Regarding client X, it can be seen from the reported user behavior identification information that, the action tag of client X is shopping, the current state information of the client includes the geographic location of the client such as Beijing China and the shopping category of the client such as the middle-aged and old clothing. By detecting the client according to the client action tag and the current state information of the client, it is obtained that the client is located in a northern city of China, and the user often buys middle-aged clothing, and thus the detecting result is buying middle-aged and old clothing in the North.

When detecting the target information matched with the detecting result, the server has following information which can be pushed: children shopping information in the North, middle-aged and old clothing shopping information in the North, computer books shopping information, and game application downloading information. After selecting the target information matched with the detecting result, i.e. the middle-aged and old clothing shopping information in the North, the server pushes it to the client.

It can be seen that, in this embodiment, the actual scenario features and user behavior characteristics are taken into consideration when pushing information, and different information is pushed with respect to different scenarios and different user behaviors, thus reducing interference to the user caused by pushing information and significantly enhancing the desired effect of pushing information.

Figure 4:
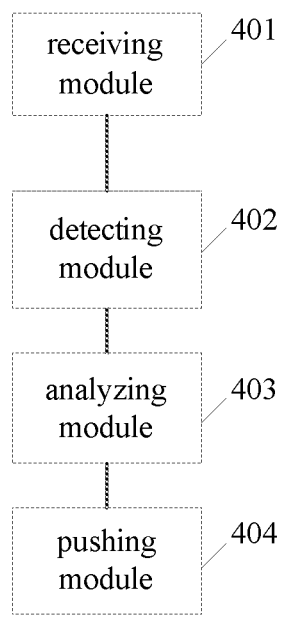
FIG. 4 is a block diagram of another device for pushing information according to an embodiment of the present disclosure.

FIG. 4 is a block diagram of another device for pushing information according to an embodiment of the present disclosure. This embodiment may be applied in a server and the device includes a receiving module 401, a detecting module 402, an analyzing module 403 and a pushing module 404.

The receiving module 401 is configured to receive user behavior identification information from a client, and to store the user behavior identification information and a corresponding client identification, in which the user behavior identification information includes a client action tag and current state information of the client.

The detecting module 402 is configured to detect the client according to the client action tag and the current state information of the client when the server is required to push information to the client, so as to obtain a detecting result, in which the detecting result is behavior attribute information based on the current state information of the client.

The analyzing module 403 is configured to select target information matched with the detecting result.

The pushing module 404 is configured to push the target information to the client corresponding to the detecting result.

Figure 5:
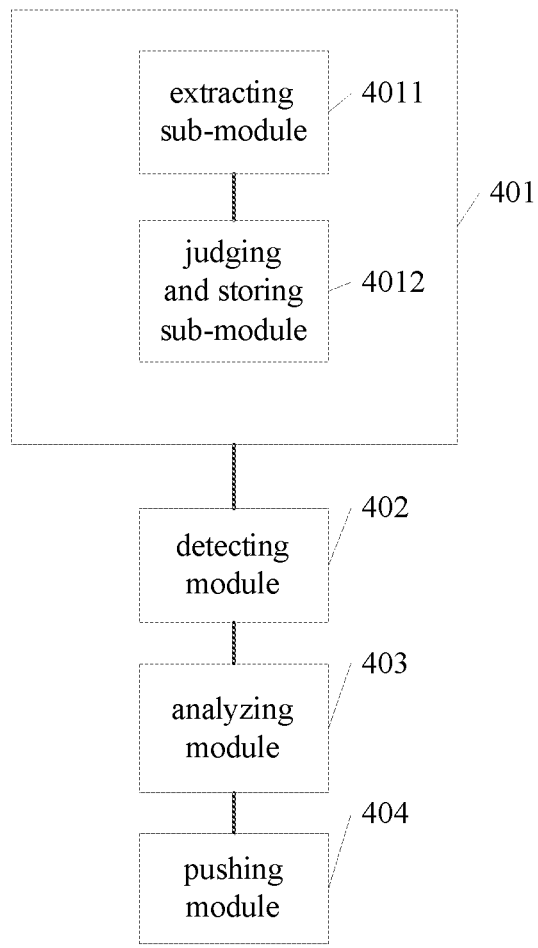
FIG. 5 is a block diagram of another device for pushing information according to an embodiment of the present disclosure.

It should be noted that, referring to FIG. 5, the receiving module 401 includes an extracting sub-module 4011 and a judging and storing sub-module 4012.

The extracting sub-module 4011 is configured to receive the user behavior identification information from the client and to extract the client identification from the user behavior identification information.

The judging and storing sub-module 4012 is configured to judge whether the client identification is stored locally, to directly store the user identification and the corresponding user behavior identification information in local if the client identification is not stored locally, and to replace the user behavior identification information stored locally with the received user behavior identification information if the client identification is stored locally.

It should be noted that, the client action tag may be any one or any combination of game, shopping, novel, software, weather and house. Certainly, the above examples are only for illustrative explanation, and the client action tag is not limited to this in practical use.

When the client action tag is game, the current state information of the client may be any one or any combination of following items, but is not limited to following items in practical use:

a number of game applications installed in the client, for example, having installed five game applications;

a number of times for starting the game applications during a predetermined period, for example, starting the game applications three times every day;

a time duration of running the game applications during a predetermined period, for example, running the game applications for two hours every day;

a style of game applications running during a predetermined period, for example, running chess games every week;

a number of times for downloading updated game applications during a predetermined period, for example, downloading updated game applications four times every week;

a total number of times for downloading updated game applications, for example, downloading updated game applications ten times every month.

The predetermined period may be several hours, one day, one week, one month, etc.

When the client action tag is game, the above described current state information of the client are only illustrative, and is not used for limitation in practical use.

When the client action tag is shopping, the current state information of the client may be any one or any combination of following items, but not limited to the following items in practical use:

geographic location information of the client, for example, the client being located at Beijing China;

shopping category information of the client, for example, the shopping category being middle-aged and old clothing;

a time duration of browsing shopping websites, for example, browsing shopping websites two hours every day.

When the client action tag is shopping, the above described current state information of the client are only illustrative, and is not used for limitation in practical use.

It can be seen that, in this embodiment, the actual scenario features and user behavior characteristics are taken into consideration when pushing information, and different information is pushed with respect to different scenarios and different user behaviors, thus reducing interference to the user caused by pushing information and significantly enhancing the desired effect of pushing information.

With respect to the client and device embodiments, since they are substantially similar to the method embodiments, they are described briefly, and for related content, please refer to the description of method embodiments.

Embodiments of the present disclosure also provide a readable storage medium for storing computer programs that, when executed, performs the above method for pushing information.

It should be noted that, in the present disclosure, relational terms such as first and second are only used distinguish one entity or operation from another entity or operation, but do not require or imply any actual relation or order between these entities or operations. Moreover, terms such as "including", "comprising" or any other variants are intended to cover non-exclusive containing, such that the process, method, product or apparatus including a series of elements does not only include those items, but also include other elements which are not listed explicitly, or also include elements inherently included in the process, method, product or apparatus. Without more limitations, the element defined by a phase of "including a/an" does not exclude that the process, method, product or apparatus including the element includes other equivalent elements.

It should be understood for those skilled in the art that, all or part of steps implementing the above method embodiments can be realized by programs to instruct related hardware. The programs can be stored in a computer-readable storage medium, and the storage medium herein is ROM/RAM, disk, CD, etc.

The above description is only preferred embodiments of the present disclosure and is not used to limit the present disclosure. Any modification, alternative or improvement made within the spirit and principle of the present disclosure falls in the protection scope of the present disclosure.

The invention claimed is:

1. A method for pushing information, the method comprising:

collecting, at a mobile terminal, usage habit information of a user;

detecting, at the mobile terminal, that an information pushing trigger condition is satisfied;

obtaining, at the mobile terminal, current battery power information and current time information of the mobile terminal;

determining, at the mobile terminal, state information of the mobile terminal during a predetermined period starting from a current time according to the current time information and the usage habit information of the user;

calculating, at the mobile terminal, an estimated power consumption during the predetermined period starting from the current time according to the state information;

generating, at the mobile terminal, first prompt information matched with a current state of the user according to the usage habit information, the current battery power information and the current time information, the first prompt information comprising a power prompt function according to the current battery power information and the estimated power consumption; and pushing, at the mobile terminal, the first prompt information.

2. The method according to claim 1, wherein the information pushing trigger condition comprises at least one of a timing trigger, triggering at a specified location, or triggering if detecting a specified signal.

3. The method according to claim 2, wherein the information pushing trigger condition is the timing trigger, and the method further comprises:

determining that a predetermined subscription trigger time has been reached;

in response, detecting a current geographic location of the mobile terminal;

obtaining subscription information based on the geographic location;

generating second prompt information comprising the subscription information; and pushing the second prompt information.

4. The method according to claim 1, wherein the generating the first prompt information comprises:

determining state information of the mobile terminal during a predetermined period starting from the current time according to the current time information and the usage habit information of the user; and generating the first prompt information having a battery usage scheme according to the state information.

5. The method according to claim 1, further comprising:

recording first running information of respective functions in the mobile terminal;

recording second running information and updating information of respective applications in the mobile terminal; and obtaining the usage habit information of the user by statistics according to at least one of the recorded first running information, the recorded second running information, or the recorded updating information.

6. A mobile terminal configured to:

collect usage habit information of a user;

detect whether an information pushing trigger condition is satisfied;

determine that the information pushing trigger condition is satisfied, wherein the information pushing trigger condition comprises a timing trigger;

in response to the determination that the information pushing trigger condition is satisfied, obtain current battery power information and current time information of the mobile terminal, the current time information indicating a current time;

generate first prompt information matched with a current state of the user according to the usage habit information, the current battery power information and the current time information;
push the first prompt information;
detect a current geographic location of the mobile terminal;
obtain subscription information based on the geographic location;
determine that a subscription trigger time has been reached;
in response to the determination that the subscription trigger time has been reached, generate second prompt information comprising the subscription information; and push the second prompt information.

7. The mobile terminal according to claim 6, wherein the information pushing trigger condition further comprises triggering at a specified location or triggering if detecting a specified signal.

8. The mobile terminal according to claim 6, further configured to:
determine state information of the mobile terminal during a predetermined period starting from the current time according to the current time information and the usage habit information of the user;
calculate an estimated power consumption during the predetermined period starting from the current time according to the state information; and
generate the first prompt information comprising a power prompt function according to the current battery power information and the estimated power consumption.

9. The mobile terminal according to claim 6, further configured to:
determine state information of the mobile terminal during a predetermined period starting from the current time according to the current time information and the usage habit information of the user; and
generate the first prompt information having a battery usage scheme according to the state information.

10. The mobile terminal according to claim 6, further configured to:
record first running information of respective functions in the mobile terminal;
record second running information and updating information of respective applications in the mobile terminal; and
obtain the usage habit information of the user by statistics according to at least one of the recorded first running information, the recorded second running information, or the recorded updating information.

11. A computer-readable storage medium configured for storing computer programs that, when executed, perform operations comprising:
detecting that an information pushing trigger condition is satisfied;
in response, obtaining current battery power information and current time information of the mobile terminal, the current time information indicating a current time;
determining state information of the mobile terminal during a predetermined period starting from the current time according to the current time information and the usage habit information of the user;
calculating an estimated power consumption during the predetermined period starting from the current time according to the state information;
generating first prompt information matched with a current state of the user according to the usage habit information, the current battery power information and the current time information, the first prompt information comprising a power prompt function according to the current battery power information and the estimated power consumption; and
pushing the first prompt information.

12. The computer-readable storage medium according to claim 11, wherein the information pushing trigger condition comprises at least one of a timing trigger, triggering at a specified location, or triggering if detecting a specified signal.

13. The computer-readable storage medium according to claim 12, wherein the information pushing trigger condition is the timing trigger, and the operations further comprise, in response to a predetermined subscription trigger time being reached:
detecting a current geographic location of the mobile terminal;
obtaining subscription information based on the geographic location;
generating second prompt information comprising the subscription information; and
pushing the second prompt information.

14. The computer-readable storage medium according to claim 11, the operations further comprising:
determining state information of the mobile terminal during a predetermined period starting from the current time according to the current time information and the usage habit information of the user; and
generating the first prompt information having a battery usage scheme according to the state information.

15. The computer-readable storage medium according to claim 11, the operations further comprising:
recording first running information of respective functions in the mobile terminal;
recording second running information and updating information of respective applications in the mobile terminal; and
obtaining the usage habit information of the user by statistics according to at least one of the recorded running information, the recorded second running information, or the recorded updating information.

* * * * *